United States Patent [19]

Narayan et al.

[11] 4,410,641
[45] Oct. 18, 1983

[54] POLYSIOCYANURATE-POLYURETHANE FOAMS

[75] Inventors: Thirumurti Narayan, Grosse Ile; Theodore O. Stolz, Detroit; John T. Patton, Jr., Wyandotte, all of Mich.

[73] Assignee: BASF Wyandotte Corporation, Wyandotte, Mich.

[21] Appl. No.: 336,877

[22] Filed: Jan. 4, 1982

[51] Int. Cl.$^3$ .................. C08G 18/14; C08G 18/32
[52] U.S. Cl. ............................. 521/167; 521/125; 521/129; 521/128; 521/902; 521/131; 521/99
[58] Field of Search .................. 521/902, 167

[56] References Cited

U.S. PATENT DOCUMENTS

| | | | |
|---|---|---|---|
| 3,493,525 | 2/1970 | Britain | 521/167 |
| 3,597,371 | 8/1971 | Britain | 521/167 |
| 3,922,238 | 11/1975 | Narayan et al. | 521/126 |
| 4,067,833 | 1/1978 | Austin et al. | 521/129 |
| 4,165,414 | 8/1979 | Narayan et al. | 521/129 |
| 4,169,921 | 10/1979 | Moss et al. | 521/902 |

Primary Examiner—H. S. Cockeram
Attorney, Agent, or Firm—Norbert M. Lisicki

[57] ABSTRACT

Polyisocyanurate-polyurethane foams are prepared by reacting an organic polyisocyanate with oxyethylated aromatic amines and diols having equivalent weights from 31 to 100 and at an isocyanate index of 150 to 500 in the presence of a trimerization catalyst and a blowing agent.

3 Claims, No Drawings

POLYSIOCYANURATE-POLYURETHANE FOAMS

BACKGROUND OF THE INVENTION

1. Field of the Invention

The present invention relates to a process for the preparation of polyisocyanurate-polyurethane foams. More particularly the invention relates to the preparation of polyisocyanurate-polyurethane foams employing as the polyol component a combination of oxyethylated aromatic amines and a diol having equivalent weights ranging from 31 to 100.

2. Prior Art

The preparation of foams characterized by isocyanurate and urethane linkages is well known in the art. The excellent thermal stability and flame retardant properties of polyisocyanurate foams are well recognized. In conjunction with that fact it is known that polyisocyanurate foams are brittle and friable. Attempts have been made to improve the friability and strength properties by incorporating urea, urethane, amide or imide groups in the polyisocyanurate foam structures. U.S. Pat. No. 4,165,414 teaches the preparation of foams characterized by isocyanurate and urethane linkages by reacting organic polyisocyanates with a polyol which is the reaction product of ethylene oxide with toluene diamine. U.S. Pat. No. 3,922,238 teaches the preparation of foams by reacting an organic polyisocyanate in the presence of a blowing agent and from 0.01 to 0.5 equivalent of a primary hydroxyl terminated polyoxyalkylene or polyester polyol per equivalent of isocyanate. U.S. Pat. No. 4,067,833 teaches the preparation of urethane-modified polyisocyanurate foams employing organic polyisocyanates and alkylene oxide products of aniline. U.S. Pat. No. 4,169,921 teaches a process for the preparation of polyisocyanurate compositions employing certain tertiary amino phenols.

Generally the use of primary hydroxyl terminated polyols for the preparation of foams results in poor insulation properties as expressed by the K factor. Furthermore, foams prepared at an isocyanate index of 200 to 400 exhibit shrinkage and thus require flame retardant additives to restore the flame retardancy and larger amounts of catalyst to alleviate the shrinkage problems. The present invention employs a specific combination of two polyols, one of which is a diol, which combination eliminates the above stated disadvantages and yields foams with a good balance of properties.

SUMMARY OF THE INVENTION

The present invention relates to the use of a mixture of oxyethylated aromatic amines and a diol having equivalent weights ranging from 31 to 100 for the preparation of polyisocyanurate-polyurethane foams.

DESCRIPTION OF THE PREFERRED EMBODIMENTS

Accordingly, the invention relates to an improved process for the preparation of polyisocyanurate-polyurethane foams which comprises reacting an organic polyisocyanate with a polyol at an isocyanate index of 150 to 500 in the presence of a blowing agent and an effective amount of a trimerization catalyst. This improvement comprises employing as the polyol component an oxyethylated amine and a diol having an equivalent weight between 31 and 100.

The mixtures of polyols which are of use in the process of the subject invention are aromatic amines which have been oxyalkylated to form polyols. More specifically, the amines include oxyethylated 2,3-,2,4-,3,4-, 2,5-, or 2,6-toluene diamines or mixtures thereof. Furthermore, the various oxyethylated diamino diphenylmethanes such as 4,4'; 2,2'; and 2,4' diamino diphenylmethanes and oxyethylated polymethylene polyphenylene polyamines having a functionality from 2 to 3 may be employed. Additionally, mixtures of diols with the amine polyols include those diols having equivalent weights between 31 and 100. Examples of these include ethylene glycol, diethylene glycol, triethylene glycol, tetraethylene glycol, polyethylene glycol of 200 molecular weight, 1,2-propanediol, 1,4-butanediol, 1,5-pentanediol, 1,6-hexanediol, 1,7-heptanediol and the like. The concentrations of the polyols which are employed range from 0.2 equivalent to 0.7 equivalent of polyol per equivalent of polyisocyanate.

The organic polyisocyanate employed in the instant invention corresponds to the formula R(NCO)z, where R is a polyvalent organic radical which is either aliphatic, arylalkyl, alkylaryl, aromatic or mixtures thereof; and z is an integer which corresponds to the valence of R and is at least 2. Representative of the organic polyisocyanates contemplated herein include, for example, aromatic isocyanates, polyisocyanates such as 2,4-toluene diisocyanate, 2,6-toluene diisocyanate, mixtures of 2,4- and 2,6-toluene diisocyanates, crude toluene diisocyanate, 4,4'-diphenylmethane diisocyanate, 2,4'-diphenylmethane diisocyanate, mixtures of 4,4' and 2,4' diphenylmethane diisocyanate and the like; the aromatic triisocyanates include such as 4,4', 4" triphenylmethane triisocyanate, 2,4,6-toluene triisocyanate; the aromatic tetraisocyanate such as 4,4'-dimethyl-2,2',5,5'-diphenylmethane tetra-isocyanate and the like; arylalkyl polyisocyanates such as xylylene diisocyanate; aliphatic polyisocyanates such as 1,6 xylene diisocyanates and the like; and mixtures thereof. Other polyisocyanates include polymethylene polyphenylene polyisocyanates, hydrogenated polymethylene polyphenylene polyisocyanate, hydrogenated toluene diisocyanate, methylphenylene diisocyanate, 1,5 naphthalene diisocyanate, 2,4-methoxyphenylene diisocyanate, 4,4'-biphenyl diisocyanate, 3,3'-dimethyl 4,4'-biphenyl diisocyanate, and 3,3'-dimethyl 4,4'-diphenylmethane diisocyanate. These polyisocyanates are prepared by conventional methods known to the art such as the phosgenation of the corresponding organic amines. Preferred polyisocyanates are 4,4'-diphenylmethane diisocyanate, polymethylene polyphenylene polyisocyanate, 2,4-toluene diisocyanate, 2,6-toluene diisocyanate mixtures thereof or crude toluene diisocyanate. Most preferrred is polymethylene polyphenylene polyisocyanate.

The trimerization catalysts for the preparation of polyurethane-polyisocyanurate foams of the present invention include metal carboxylates, tertiary amine trimerization catalysts, quaternary ammonium carboxylates, alkali metal alkoxides, alkali metal phenoxides and the like. Representative metal carboxylates are: sodium and potassium formates, acetates, and 2-ethylhexanoates. Preferred tertiary amine catalysts are: 1,3,5-tris(N,N-dimethylaminopropyl)-s-hexahydrotriazine, o- and p-(dimethylaminomethyl)phenols, 2,4,6-tris(dimethylaminomethyl) phenol. The quaternary ammonium salts include tetramethylammonium formate, acetate, 2-ethyhexanoate and the like. Also employed are the compositions which are the reaction products of (a) tertiary amine, (b) alkylene oxide, and (c) a monocarboxylic acid as disclosed in U.S. Pat. No. 4,148,980 which disclosure is incorporated herein by reference.

The concentration of polymerization catalysts which may be employed in the present invention is from 0.001 part to 20 parts of catalyst per 100 parts of organic polyisocyanate.

Foams of the present invention are prepared by mixing together the organic polyisocyanate, the polyol, blowing agent and the catalyst at initiating temperature which, depending on the catalyst, will range from about 25° to 50° C.

It is possible to proceed with the preparation of the polyisocyanurate-polyurethane foams by a prepolymer technique wherein an excess of organic polyisocyanate is reacted in a first step with the polyol to prepare a prepolymer having free isocyanate groups which is then reacted in a second step with water to prepare a foam. Alternately, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexanhydrobenzodinitrile; halogenated hydrocarbons such as dichlorodifluoromethane, trichlorofluoromethane, dichlorodifluoroethane, vinylidene chloride, and methylene chloride may be used as blowing agents.

If desired, a surface-active agent may be employed. Numerous surface-active agents have been found satisfactory. Nonionic surface-active agents are preferred. Of these, the nonionic surface-active agents prepared by the sequential addition of propylene oxide and then ethylene oxide to propylene glycol and the solid or liquid organosilicones have been found particularly desirable. Other surface-active agents which are operative, although not preferred, include polyethylene glycol ethers of long chain alcohols, tertiary amine or alkanolamine salts of long chain alkyl acid surfate esters, alkylsulfonic esters, and alkylarylsulfonic acids. The present invention also contemplates the incorporation of additional ingredients in the foam formulation including such things as plasticizers, inorganic fillers, pigments and the like. Following are specific non-limiting examples which are provided to illustrate the enumerated principles described herein. All parts are by weight unless otherwise indicated. In the examples which follow these abbreviations are employed:

| | |
|---|---|
| MDI | crude diphenylmethane diisocyanate |
| TDH | 1,3,5-tris(N,N—dimethylaminopropyl)-s-hexahydrotriazine |
| L 5410 | a silicone surfactant |
| FREON 11A | trichloromonofloromethane |
| DMP 30 | 2,4,6-tri(dimethylaminomethyl) phenol |
| Catalyst A | a 66 percent solution of potassium 2-ethylhexanoate in polyoxypropylene glycol molecular weight 400 |
| Polyol A | a polyol prepared by the reaction of ethylene oxide with 2,3-toluenediamine having an equivalent weight of 125. |
| DEG | diethylene glycol |
| Isocyanate Index | $\dfrac{\text{no. of equivalents of NCO}}{\text{no. of equivalents of OH}} \times 100$ |

EXAMPLE 1

The foam listed in Example 1 was produced using the one-shot technique with typical high pressure machinery. Specifically, the resin and isocyanate components were charged to temperature controlled feed tanks and conditioned to 25° C.±3° C. The metering pumps and machine head orifice sizes were determined for delivery of the 1:2, resin:isocyanate stream ratio required by formulation. At the time of foam making the resin and isocyanate were introduced into the mixing chamber and mixed by the high pressure impingement mixing technique. The foam mass exiting the machine head was dispensed into preheated (120° F.), 4 foot×2 foot×4 inch panel molds. After a reasonable period of time the resultant panels were demolded and made available for testing purposes.

The foam properties exhibit good flame retardancy as measured by the ASTM E-84 tunnel test and good heat-aged dimensional stability.

TABLE I

| Example 1 | |
|---|---|
| Ingredients, pbw | |
| MDI | 200 |
| FREON 11A | 50 |
| Polyol A | 31.3 |
| DEG | 13.0 |
| TDH | 1.1 |
| DC-193 | 2.0 |
| Index | 300 |
| Properties | |
| Density, core, pcf | 1.75 |
| Compressive strength, psi | |
| parallel | |
| 10% defl. | 24.8 |
| at yield | 21.4 |
| % defl. at yield | 9.0 |
| perpendicular | |
| 10% defl. | 16.7 |
| at yield | 16.0 |
| % defl. at yield | 8.0 |
| Compressive modulus, psi | |
| parallel | 451 |
| perpendicular | 298 |
| K-factor | |
| initial | 0.132 |
| aged 10 days at 140° F. | 0.156 |
| Butler Chimney, % wt. retention | 84.1 |
| Friability, % wt. loss | 28.2 |
| Closed cells, % corr. | 99 |
| Tensile strength, psi, parallel | 29.0 |
| Elongation, % parallel | 3.7 |
| Tensile modulus, parallel | 755 |
| Flexural strength, psi, parallel | 35.1 |
| Shear Strength, psi, parallel | 44.0 |
| Shear modulus, parallel | 295 |
| MVT, perm-in. | 2.04 |
| SSC, % volume change | |
| 158° F., 100% R.H. | |
| 1 day | 3.0 |
| 2 days | 2.8 |
| 7 days | 3.5 |
| 14 days | 4.4 |
| 28 days | 3.7 |
| 200° F. | |
| 1 day | 0.2 |
| 2 days | 0.1 |
| 7 days | 1.5 |
| 14 days | 1.3 |
| 28 days | 1.7 |
| −20° F. | |
| 1 day | 0.1 |
| 2 days | 0 |
| 7 days | +0.4 |
| ASTM E-84 (3" panel) | |
| flame spread rating | 25 |

TABLE I-continued

| Example 1 | |
|---|---|
| smoke rating | 215 |

EXAMPLES 2-37

In the following Tables II through X, the ingredients, the foaming reactivity and the properties of foams prepared employing Polyol A alone as taught in the prior art and the foam prepared according to the present invention employing a mixture of Polyol A and DEG are compared. The improved flame retardant properties as measured by the Butler Chimney Test and the improved heat-aged properties are clearly apparent.

The foams were prepared by the "hand-mix" method using the following components:

| | |
|---|---|
| Component A = | MDI |
| | FREON 11A |
| Component B - | Polyol or a blend of polyols |
| | Catalysts |
| | Surfactants/FREON 11A |

Component B, which was held in the syringe, was introduced into Component A in one shot, which was being stirred at the highest possible speed. The stirring was continued for a certain mixing time and then the contents were poured into an open wooden mold and allowed to rise therein. The foams were stored at least for 24 hours at ambient conditions before determining the properties. The specific formulation and the properties of the foams prepared are shown in Tables II through X.

TABLE II

Examples 2-4
(Isocyanate Index 200)

| | 2 | 3 | 4 |
|---|---|---|---|
| Ingredients, pbw | | | |
| MDI | 168.9 | 168.9 | 168.9 |
| FREON 11A | 48.0 | 48.0 | 48.0 |
| Catalyst A | 1.7 | 1.7 | 1.7 |
| L 5410 | 2.0 | 2.0 | 2.0 |
| Polyol A | 79.2 | 59.4 | 39.6 |
| DEG | — | 8.3 | 16.6 |
| Eq. Ratio Polyol A to DEG | — | 3:1 | 1:1 |
| Reactivity, sec. | | | |
| Cream Time | 20 | 30 | 38 |
| Gel Time | 30 | 40 | 53 |
| Rise Time | 47 | 62 | 74 |
| Tack Free Time | 35 | 47 | 60 |
| Properties | | | |
| Density, pcf | 1.8 | 1.6 | 1.7 |
| Closed Cells, % un corr. | 92 | 91 | 89 |
| K-Factor, initial | 0.116 | 0.116 | 0.121 |
| Aged, 10 days, 140° F. | 0.125 | 0.136 | 0.145 |
| Compr. Str., 10% defl., psi. | 34 | 31 | 24 |
| Friab., wt. loss, % | 7 | 10 | 13 |
| Butler wt. retained, % | 34 | 51 | 46 |
| Flame ht., inches | 9.8 | 9.8 | 9.8 |
| Time to SX, seconds | 35 | 18 | 24 |
| NBS Smoke Density, Dm | 116 | 76 | 77 |
| Simulated Service Test | | | |
| % Volume Change 158° F., 100% RH | | | |
| 1 day | 7.4 | 5.8 | 5.6 |
| 7 days | 10.1 | 9.0 | 7.0 |
| 14 days | 15.4 | 11.7 | 9.6 |
| 28 days | 25.9 | 15.5 | 11.3 |

TABLE II-continued

Examples 2-4
(Isocyanate Index 200)

| | 2 | 3 | 4 |
|---|---|---|---|
| Dry Heat, 250° F. | | | |
| 1 day | 11.1 | 6.6 | 8.3 |
| 7 days | 30.3 | 15.7 | 17.1 |
| 14 days | 36.0 | 27.1 | 27.0 |
| 28 days | 40.2 | 24.5 | 28.2 |

TABLE III

Examples 5-7
(Isocyanate Index 250)

| | 5 | 6 | 7 |
|---|---|---|---|
| Ingredients, pbw | | | |
| MDI | 180.4 | 180.4 | 180.4 |
| FREON 11A | 48.0 | 48.0 | 48.0 |
| Catalyst A | 1.8 | 1.8 | 1.8 |
| L 5410 | 2.1 | 2.1 | 2.1 |
| Polyol A | 67.7 | 50.8 | 33.9 |
| DEG | — | 7.1 | 14.2 |
| Eq. Ratio Polyol A to DEG | — | 3:1 | 1:1 |
| Reactivity, sec. | | | |
| Cream Time | 18 | 27 | 40 |
| Gel Time | 28 | 37 | 51 |
| Rise Time | 44 | 52 | 70 |
| Tack Free Time | 33 | 45 | 61 |
| Properties | | | |
| Density, pcf | 1.9 | 1.7 | 1.8 |
| Closed Cells, % un corr. | 93 | 91 | 89 |
| K-Factor, initial | 0.115 | 0.113 | 0.122 |
| Aged, 10 days, 140° F. | 0.128 | 0.133 | 0.149 |
| Compr. Str., 10% defl., psi. | 33 | 34 | 34 |
| Friab., wt. loss, % | 12 | 13 | 19 |
| Butler wt. retained, % | 52 | 65 | 70 |
| Flame ht., inches | 9.8 | 9.8 | 9.8 |
| Time to SX, seconds | 27 | 18 | 14 |
| NBS Smoke Density, Dm | 112 | 83 | 87 |
| Simulated Service Test | | | |
| % Volume Change 158° F., 100% RH | | | |
| 1 day | 5.5 | 5.4 | 5.8 |
| 7 days | 7.3 | 7.3 | 7.0 |
| 14 days | 13.1 | 9.9 | 10.1 |
| 28 days | 15.7 | 11.9 | 9.6 |
| Dry Heat, 250° F. | | | |
| 1 day | 7.4 | 4.8 | 4.3 |
| 7 days | 14.4 | 10.8 | 8.1 |
| 14 days | 21.7 | 14.9 | 11.4 |
| 28 days | 23.5 | 16.0 | 12.3 |

TABLE IV

Examples 8-10
(Isocyanate Index 300)

| | 8 | 9 | 10 |
|---|---|---|---|
| Ingredients, pbw | | | |
| MDI | 188.7 | 188.7 | 188.7 |
| FREON 11A | 48.0 | 48.0 | 48.0 |
| Catalyst A | 1.9 | 1.9 | 1.9 |
| L 5410 | 2.3 | 2.3 | 2.3 |
| Polyol A | 59.0 | 44.2 | 29.5 |
| DEG | — | 6.2 | 12.3 |
| Eq. Ratio Polyol A to DEG | — | 3:1 | 1:1 |
| Reactivity, sec. | | | |
| Cream Time | 18 | 26 | 36 |
| Gel Time | 27 | 34 | 46 |
| Rise Time | 44 | 48 | 60 |
| Tack Free Time | 32 | 42 | 51 |
| Properties | | | |
| Density, pcf | 1.9 | 1.8 | 1.9 |

TABLE IV-continued

Examples 8-10
(Isocyanate Index 300)

| | 8 | 9 | 10 |
|---|---|---|---|
| Closed Cells, % | | | |
| un corr. | 92 | 93 | 90 |
| K-Factor, initial | 0.115 | 0.115 | 0.123 |
| Aged, 10 days, 140° F. | 0.129 | 0.141 | 0.154 |
| Compr. Str., 10% defl., psi. | 37 | 38 | 29 |
| Friab., wt. loss, % | 14 | 17 | 32 |
| Butler wt. retained, % | 64 | 83 | 80 |
| Flame ht., inches | 9.8 | 8.9 | 7.9 |
| Time to SX, seconds | 18 | 10 | 11 |
| NBS Smoke Density, Dm | 107 | 104 | 90 |
| Simulated Service Test | | | |
| % Volume Change | | | |
| 158° F., 100% RH | | | |
| 1 day | 5.5 | 4.0 | 5.9 |
| 7 days | 7.9 | 8.2 | 6.6 |
| 14 days | 11.9 | 11.3 | 9.1 |
| 28 days | 16.2 | 12.3 | 9.6 |
| Dry Heat, 250° F. | | | |
| 1 day | 8.6 | 4.0 | 4.3 |
| 7 days | 14.8 | 8.2 | 8.1 |
| 14 days | 17.5 | 11.3 | 11.4 |
| 28 days | 21.5 | 12.3 | 12.3 |

TABLE V

Examples 11-13
(Isocyanate Index 350)

| | 11 | 12 | 13 |
|---|---|---|---|
| Ingredients, pbw | | | |
| MDI | 195.4 | 195.4 | 195.4 |
| FREON 11A | 48.0 | 48.0 | 48.0 |
| Catalyst A | 1.9 | 1.9 | 1.9 |
| L 5410 | 2.3 | 2.3 | 2.3 |
| Polyol A | 52.4 | 39.3 | 26.2 |
| DEG | — | 5.5 | 11.0 |
| Eq. Ratio Polyol A to DEG | — | 3:1 | 1:1 |
| Reactivity, sec. | | | |
| Cream Time | 17 | 23 | 35 |
| Gel Time | 26 | 33 | 55 |
| Rise Time | 42 | 50 | 85 |
| Tack Free Time | 31 | 45 | 96 |
| Properties | | | |
| Density, pcf | 1.8 | 1.8 | 1.7 |
| Closed Cells, % | | | |
| un corr. | 93 | 92 | 90 |
| K-Factor, initial | 0.117 | 0.116 | 0.123 |
| Aged, 10 days, 140° F. | 0.137 | 0.142 | 0.154 |
| Compr. Str., 10% defl., psi. | 38 | 32 | 29 |
| Friab., wt. loss, % | 15 | 28 | 32 |
| Butler wt. retained, % | 73 | 83 | 80 |
| Flame ht., inches | 9.3 | 7.6 | 7.9 |
| Time to SX, seconds | 13 | 11 | 11 |
| NBS Smoke Density, Dm | 131 | 76 | 90 |
| Simulated Service Test | | | |
| % Volume Change | | | |
| 158° F., 100% RH | | | |
| 1 day | 5.6 | 4.5 | 5.3 |
| 7 days | 7.2 | 5.6 | 6.6 |
| 14 days | 10.0 | 7.9 | 8.1 |
| 28 days | 12.6 | 8.9 | 8.5 |
| Dry Heat, 250° F. | | | |
| 1 day | 5.6 | 3.3 | 4.7 |
| 7 days | 12.4 | 6.1 | 6.8 |
| 14 days | 18.9 | 8.8 | 9.0 |
| 28 days | 24.7 | 9.5 | 9.5 |

TABLE VI

Examples 14-16
(Isocyanate Index 400)

| | 14 | 15 | 16 |
|---|---|---|---|
| Ingredients, pbw | | | |
| MDI | 200.0 | 200.0 | 200.0 |
| FREON 11A | 48.0 | 48.0 | 48.0 |
| Catalyst A | 2.0 | 2.0 | 2.0 |
| L 5410 | 2.2 | 2.2 | 2.2 |
| Polyol A | 47.1 | 35.3 | 23.5 |
| DEG | — | 4.9 | 9.9 |
| Eq. Ratio Polyol A to DEG | — | 3:1 | 1:1 |
| Reactivity, sec. | | | |
| Cream Time | 17 | 24 | 34 |
| Gel Time | 26 | 36 | 46 |
| Rise Time | 40 | 55 | 65 |
| Tack Free Time | 33 | 55 | 60 |
| Properties | | | |
| Density, pcf | 1.9 | 1.9 | 1.9 |
| Closed Cells, % | | | |
| un corr. | 93 | 92 | 96 |
| K-Factor, initial | 0.118 | 0.117 | 0.116 |
| Aged, 10 days, 140° F. | 0.136 | 0.144 | 0.142 |
| Compr. Str., 10% defl., psi. | 39 | 38 | 35 |
| Friab., wt. loss, % | 20 | 35 | 21 |
| Butler wt. retained, % | 80 | 90 | 84 |
| Flame ht., inches | 8.3 | 7.4 | 9.1 |
| Time to SX, seconds | 11 | 10 | 11 |
| NBS Smoke Density, Dm | 86 | 91 | 107 |
| Simulated Service Test | | | |
| % Volume Change | | | |
| 158° F., 100% RH | | | |
| 1 day | 6.8 | 4.0 | 5.6 |
| 7 days | 8.9 | 5.1 | 6.7 |
| 14 days | 12.1 | 6.7 | 8.8 |
| 28 days | 14.9 | 7.6 | 8.4 |
| Dry Heat, 250° F. | | | |
| 1 day | 7.2 | 3.4 | 4.2 |
| 7 days | 11.6 | 4.8 | 7.5 |
| 14 days | 21.6 | 7.2 | 8.7 |
| 28 days | 16.9 | 7.9 | 10.3 |

TABLE VII

Examples 17-19
(Isocyanate Index 470)

| | 72 | 18 | 19 |
|---|---|---|---|
| Ingredients, pbw | | | |
| MDI | 206.2 | 206.2 | 206.2 |
| FREON 11A | 48.0 | 48.0 | 48.0 |
| Polyol A | 41.2 | 30.9 | 20.6 |
| L 5410 | 2.5 | 2.5 | 2.5 |
| Catalyst A | 2.1 | 2.1 | 2.1 |
| DEG | — | 4.3 | 8.6 |
| Eq. Ratio Polyol A to DEG | — | 3:1 | 1:1 |
| Reactivity, sec. | | | |
| Cream Time | 16 | 22 | 33 |
| Gel Time | 30 | 34 | 50 |
| Rise Time | 45 | 50 | 62 |
| Tack Free Time | 60 | 75 | 80 |
| Properties | | | |
| Density, pcf | 1.9 | 2.0 | 2.0 |
| Closed Cells, % | | | |
| un corr. | 87 | 90 | 91 |
| K-Factor, initial | 0.122 | 0.117 | 0.118 |
| Aged, 10 days, 140° F. | 0.148 | 0.147 | 0.151 |
| Compr. Str., 10% defl., psi. | 34 | 36 | 33 |
| Friab., wt. loss, % | 26 | 45 | 34 |
| Butler wt. retained, % | 85 | 91 | 92 |
| Flame ht., inches | 6.7 | 6.4 | 6.7 |
| Time to SX, seconds | 11 | 10 | 10 |
| NBS Smoke Density, Dm | 96 | 88 | 78 |

TABLE VIII

| | Examples 20-25 | | | | | |
|---|---|---|---|---|---|---|
| | 20 | 21 | 22 | 23 | 24 | 25 |
| Ingredients, pbw | | | | | | |
| MDI | 168.9 | 168.9 | 168.9 | 180.4 | 180.4 | 180.4 |
| FREON 11A | 48.0 | 48.0 | 48.0 | 48.0 | 48.0 | 48.0 |
| Polyol A | 79.2 | 59.4 | 39.6 | 67.7 | 50.8 | 33.0 |
| TDH | 1.0 | 1.0 | 1.0 | 1.1 | 1.1 | 1.1 |
| L 5410 | 2.0 | 2.0 | 2.0 | 2.1 | 2.1 | 2.1 |
| DEG | — | 8.3 | 16.6 | — | 7.1 | 14.2 |
| Eq. Ratio Polyol A to DEG | — | 3:1 | 1:1 | — | 3:1 | 1:1 |
| Isocyanate Index | 199 | 200 | 200 | 250 | 250 | 250 |
| Reactivity, sec. | | | | | | |
| Cream Time | 12 | 12 | 15 | 13 | 13 | 13 |
| Gel Time | 22 | 23 | 27 | 23 | 25 | 24 |
| Rise Time | 40 | 40 | 75 | 42 | 52 | 66 |
| Tack Free Time | 31 | 26 | 33 | 30 | 30 | 30 |
| Properties | | | | | | |
| Density, pcf | 1.7 | 1.6 | 1.5 | 1.6 | 1.6 | 1.5 |
| Closed Cells, % | | | | | | |
| uncorr. | 88 | 88 | 85 | 88 | 88 | 87 |
| corr. | 97 | 97 | 94 | 99 | 100 | 97 |
| K-Factor, initial | 0.114 | 0.117 | 0.124 | 0.119 | 0.121 | 0.123 |
| Aged, 10 days, 140° F. | 0.124 | 0.128 | 0.139 | 0.131 | 0.135 | 0.141 |
| Compr. Str., 10% defl., psi. | 29 | 24 | 19 | 28 | 29 | 22 |
| Friab., wt. loss, % | 8 | 12 | 17 | 16 | 20 | 23 |
| Butler wt. retained, % | 60 | 58 | 68 | 68 | 73 | 75 |
| Flame ht., inches | 9.8 | 9.8 | 9.8 | 9.8 | 9.3 | 9.8 |
| Time to SX, seconds | 21 | 18 | 13 | 16 | 12 | 13 |
| NBS Smoke Density, Dm | 74 | 81 | 78 | 94 | 76 | 68 |

TABLE IX

| | Examples 26-31 | | | | | |
|---|---|---|---|---|---|---|
| | 26 | 27 | 28 | 29 | 30 | 31 |
| Ingredients, pbw | | | | | | |
| MDI | 188.7 | 188.7 | 188.7 | 195.4 | 195.4 | 195.4 |
| FREON 11A | 48.0 | 48.0 | 48.0 | 48.0 | 48.0 | 48.0 |
| Polyol A | 59.0 | 44.2 | 29.5 | 52.4 | 39.3 | 28.2 |
| TDH | 1.1 | 1.1 | 1.1 | 1.1 | 1.1 | 1.1 |
| L 5410 | 2.3 | 2.3 | 2.3 | 2.3 | 2.3 | 2.3 |
| DEG | — | 6.2 | 12.3 | — | 5.5 | 11.0 |
| Eq. Ratio Polyol A to DEG | — | 3:1 | 1:1 | — | 3:1 | 1:1 |
| Isocyanate Index | 300 | 300 | 300 | 350 | 350 | 350 |
| Reactivity, sec. | | | | | | |
| Cream Time | 14 | 14 | 13 | 14 | 14 | 13 |
| Gel Time | 26 | 27 | 27 | 30 | 30 | 30 |
| Rise Time | 55 | 67 | 70 | 85 | 45 | 69 |
| Tack Free Time | 37 | 40 | 36 | 45 | 66 | 50 |
| Properties | | | | | | |
| Density, pcf | 1.7 | 1.5 | 1.5 | 1.6 | 1.6 | 1.5 |
| Closed Cells, % | | | | | | |
| uncorr. | 85 | 89 | 88 | 85 | 87 | 85 |
| corr. | 96 | 101 | 97 | 98 | 101 | 98 |
| K-Factor, initial | 0.123 | 0.127 | 0.125 | 0.128 | 0.129 | 0.126 |
| Aged, 10 days, 140° F. | 0.138 | 0.146 | 0.144 | 0.146 | 0.149 | 0.147 |
| Compr. Str., 10% defl., psi. | 27 | 25 | 24 | 26 | 26 | 24 |
| Friab., wt. loss, % | 21 | 29 | 25 | 24 | 23 | 23 |
| Butler wt. retained, % | 72 | 68 | 80 | 75 | 77 | 83 |
| Flame ht., inches | 9.8 | 8.3 | 9.8 | 9.2 | 9.9 | 9.7 |
| Time to SX, seconds | 15 | 14 | 12 | 13 | 15 | 12 |
| NBS Smoke Density, Dm | 92 | 68 | 64 | 97 | 73 | 73 |

TABLE X

| | Examples 32-37 | | | | | |
|---|---|---|---|---|---|---|
| | 32 | 33 | 34 | 35 | 36 | 37 |
| Ingredients, pbw | | | | | | |
| MDI | 200.0 | 200.0 | 200.0 | 206.2 | 206.2 | 206.2 |
| FREON 11A | 53.0 | 48.0 | 48.0 | 52.0 | 48.0 | 48.0 |
| Polyol A | 47.1 | 35.3 | 28.5 | 41.2 | 30.9 | 20.6 |
| TDH | 1.2 | 1.2 | 1.2 | 1.2 | 1.2 | 1.2 |
| L-5410 | 2.2 | 2.2 | 2.2 | 2.5 | 2.5 | 2.5 |
| DEG | — | 4.9 | 9.9 | — | 4.3 | 8.6 |
| Eq. Ratio Polyol A to DEG | — | 3:1 | 1:1 | — | 3:1 | 1:1 |
| Isocyanate Index | 400 | 400 | 400 | 470 | 470 | 470 |
| Reactivity, sec. | | | | | | |

TABLE X-continued

| | Examples 32-37 | | | | | |
|---|---|---|---|---|---|---|
| | 32 | 33 | 34 | 35 | 36 | 37 |
| Cream Time | 15 | 13 | 12 | 14 | 13 | 13 |
| Gel Time | 31 | 33 | 30 | 38 | 41 | 45 |
| Rise Time | 78 | 95 | 75 | 105 | 125 | 110 |
| Tack Free Time | 60 | 80 | 70 | 80 | 120 | 155 |
| Properties | | | | | | |
| Density, pcf | 1.5 | 1.5 | 1.6 | 1.5 | 1.6 | 1.6 |
| Closed Cells, % | | | | | | |
| uncorr. | 83 | 86 | 85 | 84 | 85 | 81 |
| corr. | 95 | 102 | 98 | 98 | 101 | 99 |
| K-Factor, initial | 0.128 | 0.131 | 0.139 | 0.136 | 0.134 | 0.139 |
| Aged, 10 days, 140° F. | 0.148 | 0.154 | 0.151 | 0.158 | 0.161 | 0.165 |
| Compr. Str., 10% defl., psi. | 24 | 23 | 24 | 25 | 24 | 24 |
| Friab., wt. loss, % | 24 | 37 | 29 | 41 | 44 | 45 |
| Butler wt. retained, % | 74 | 80 | 79 | 72 | 83 | 85 |
| Flame ht., inches | 0.0 | 6.7 | 8.3 | 8.3 | 6.7 | 6.2 |
| Time to SX, seconds | 16 | 12 | 16 | 16 | 11 | 12 |
| NBS Smoke Density, Dm | 86 | 64 | 58 | 81 | 61 | 52 |

The embodiments of the invention in which an exclusive privilege or property is claimed are defined as follows:

1. A process for the preparation of polyisocyanurate-polyurethane foams comprising reacting an organic polyisocyanate with a polyol at an isocyanate index of 150 to 470 in the presence of a blowing agent and an effective amount of a trimerization catalyst, the improvement comprising employing as the polyol component oxyethylated toluene diamine and diethylene glycol.

2. The process of claim 1 wherein the ratio of said oxyethylated toluene diamine to said diethylene glycol in the polyol component is from 1:1 to 3:1.

3. The product as prepared by the process of claim 1.

* * * * *